(12) United States Patent
Hege et al.

(10) Patent No.: US 12,397,466 B2
(45) Date of Patent: Aug. 26, 2025

(54) FRONT END CONVEYOR HAVING INTEGRATED TRANSVERSE SCRAP CONVEYOR

(71) Applicant: A. G. Stacker Inc., Weyers Cave, VA (US)

(72) Inventors: Dalton Hege, Weyers Cave, VA (US); Eric Stempihar, Rockingham, VA (US); Joseph Wunder, Lexington, VA (US); Clarence C. Allen, Jr., Mt. Crawford, VA (US)

(73) Assignee: A. G. Stacker Inc., Weyers Cave, VA (US)

( * ) Notice: Subject to any disclaimer, the term of this patent is extended or adjusted under 35 U.S.C. 154(b) by 653 days.

(21) Appl. No.: 17/734,718

(22) Filed: May 2, 2022

(65) Prior Publication Data
US 2022/0355502 A1    Nov. 10, 2022

Related U.S. Application Data

(60) Provisional application No. 63/183,889, filed on May 4, 2021.

(51) Int. Cl.
| | |
|---|---|
| B26D 7/32 | (2006.01) |
| B08B 1/34 | (2024.01) |
| B08B 5/02 | (2006.01) |
| B26D 7/06 | (2006.01) |
| B26D 7/18 | (2006.01) |

(Continued)

(52) U.S. Cl.
CPC ............ *B26D 7/32* (2013.01); *B08B 1/34* (2024.01); *B08B 5/023* (2013.01); *B26D 7/0625* (2013.01); *B26D 7/18* (2013.01); *B26D 7/1836* (2013.01); *B26D 7/1845* (2013.01); *B26D 7/1854* (2013.01); *B65G 47/22* (2013.01); *B65H 29/12* (2013.01); *B65H 29/125* (2013.01); *B65H 29/14* (2013.01); *B65H 29/6618* (2013.01); *B26D 2007/322* (2013.01);

(Continued)

(58) Field of Classification Search
None
See application file for complete search history.

(56) References Cited

U.S. PATENT DOCUMENTS

| | | | | |
|---|---|---|---|---|
| 3,776,404 | A * | 12/1973 | Anastasio | ............ B65G 57/081 198/374 |
| 4,740,193 | A * | 4/1988 | Frost | ...................... B65H 29/32 414/793.1 |

(Continued)

*Primary Examiner* — Kavel Singh
(74) *Attorney, Agent, or Firm* — J-TEK LAW PLLC; Scott T. Wakeman; Jeffrey D. Tekanic

(57) ABSTRACT

A front end conveyor includes a frame having a first side and a second side, a lower deck and an upper deck. The lower deck includes a plurality of sheet supports, and upper portions of the sheet supports lie in a first plane. The upper deck includes a plurality of sheet guides, and the plurality of sheet supports and the plurality of sheet guides define therebetween a sheet transport path for moving sheets in a sheet transport direction toward the downstream end of the front end conveyor. A transverse scrap conveyor is mounted below the lower deck to carry scrap in a direction perpendicular to the sheet transport direction. The transverse scrap conveyor is secured to and supported by the frame such that the transverse scrap conveyor is movable with the frame as a unit.

19 Claims, 15 Drawing Sheets

(51) Int. Cl.
*B65G 47/22* (2006.01)
*B65H 29/12* (2006.01)
*B65H 29/14* (2006.01)
*B65H 29/66* (2006.01)

(52) U.S. Cl.
CPC ............... *B65H 2301/5115* (2013.01); *B65H 2404/132* (2013.01); *B65H 2404/261* (2013.01); *B65H 2701/176* (2013.01)

(56) References Cited

U.S. PATENT DOCUMENTS

| | | | |
|---|---|---|---|
| 9,027,737 B2 * | 5/2015 | Talken | B26D 7/18 198/496 |
| 10,071,873 B2 | 9/2018 | Allen, Jr. et al. | |
| 10,246,273 B2 * | 4/2019 | Sardella | B26D 7/1854 |

* cited by examiner

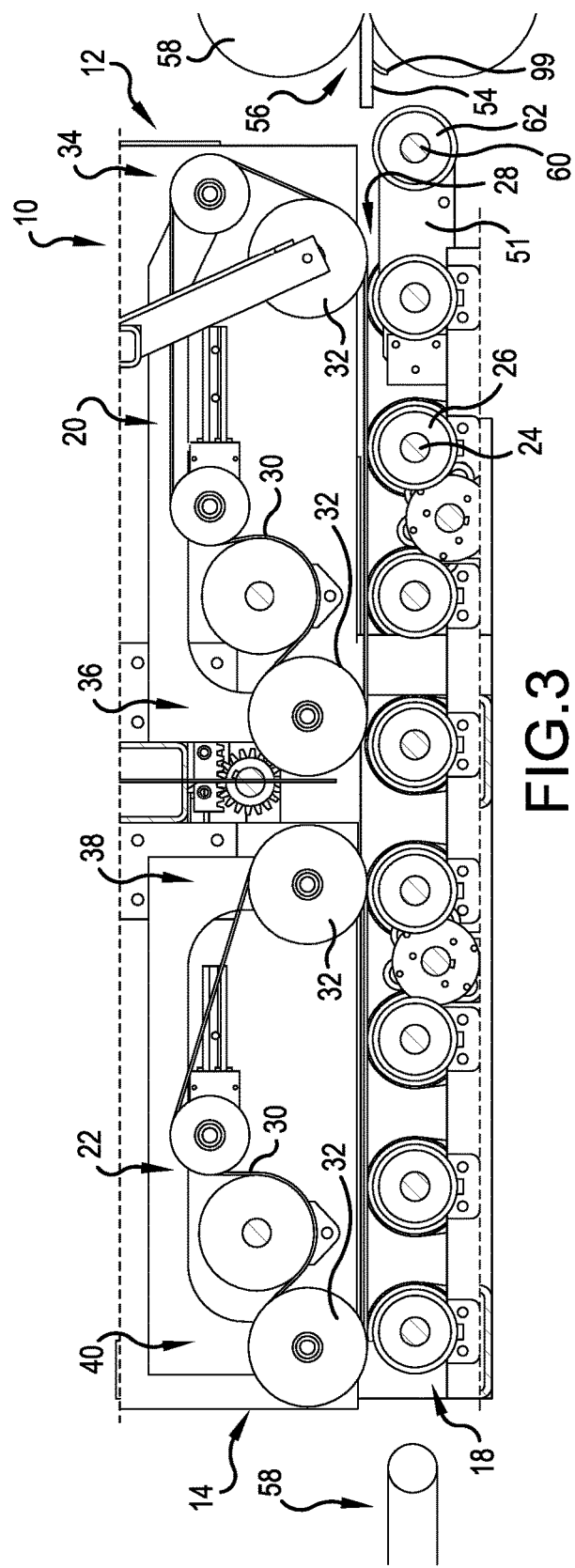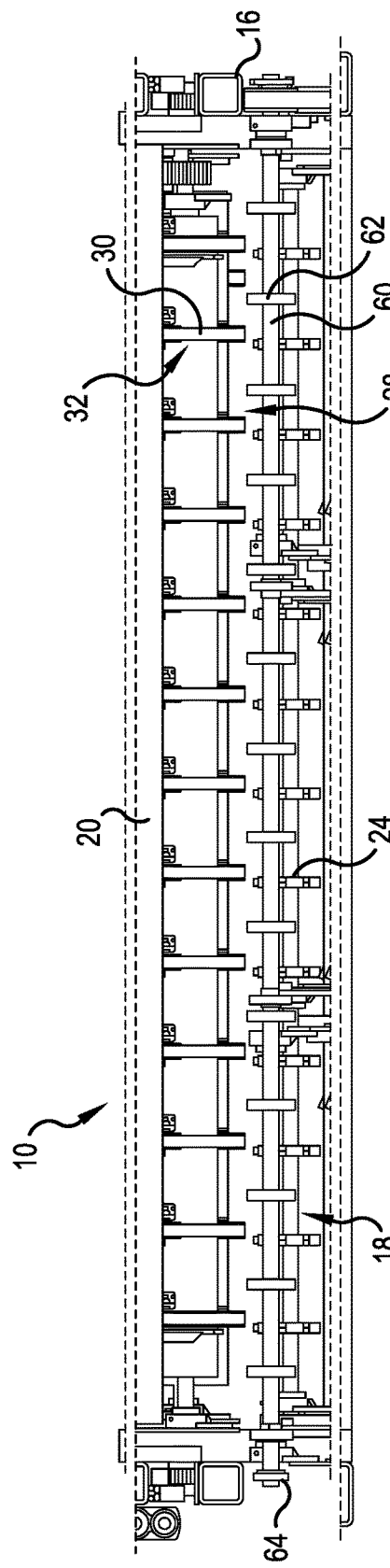

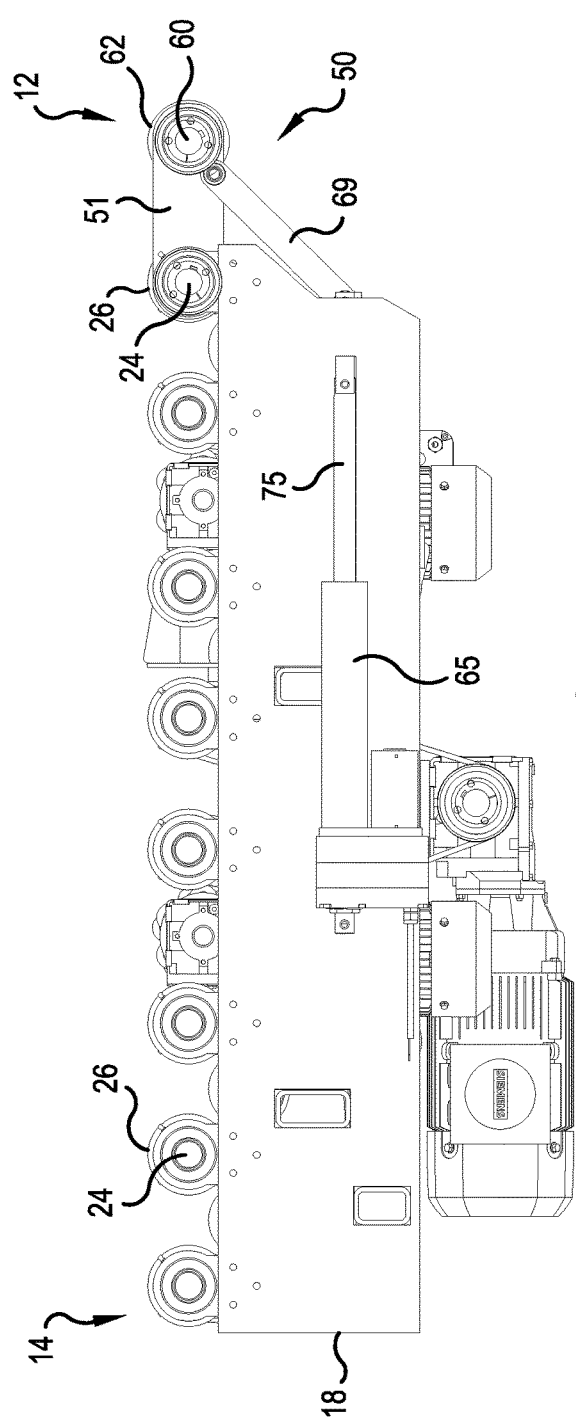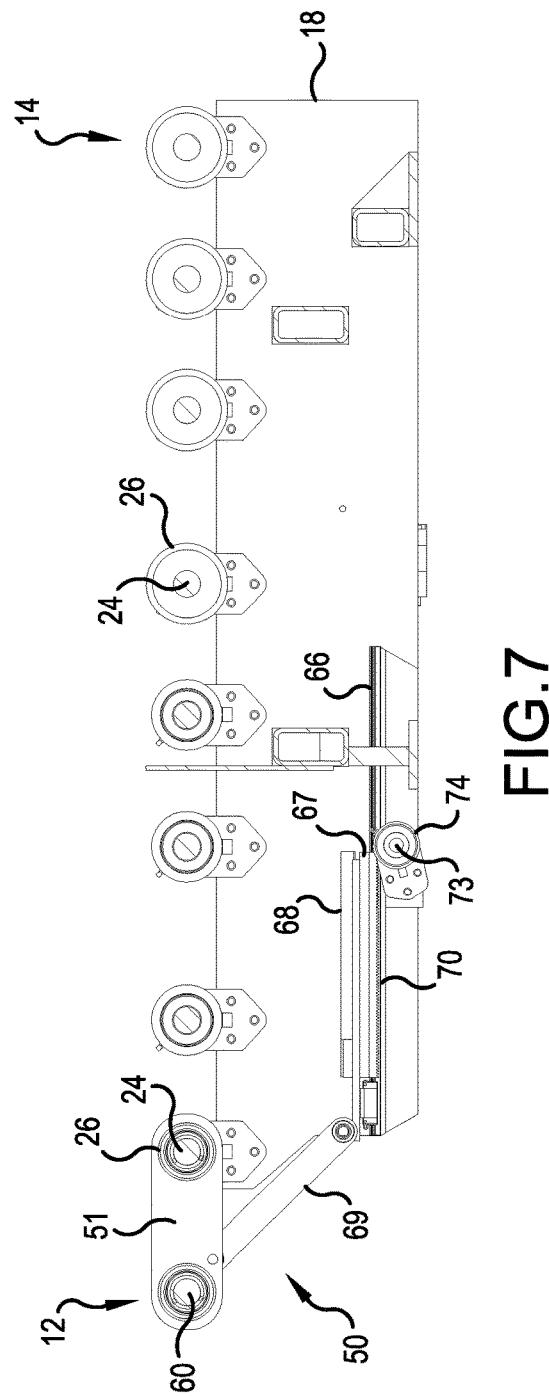

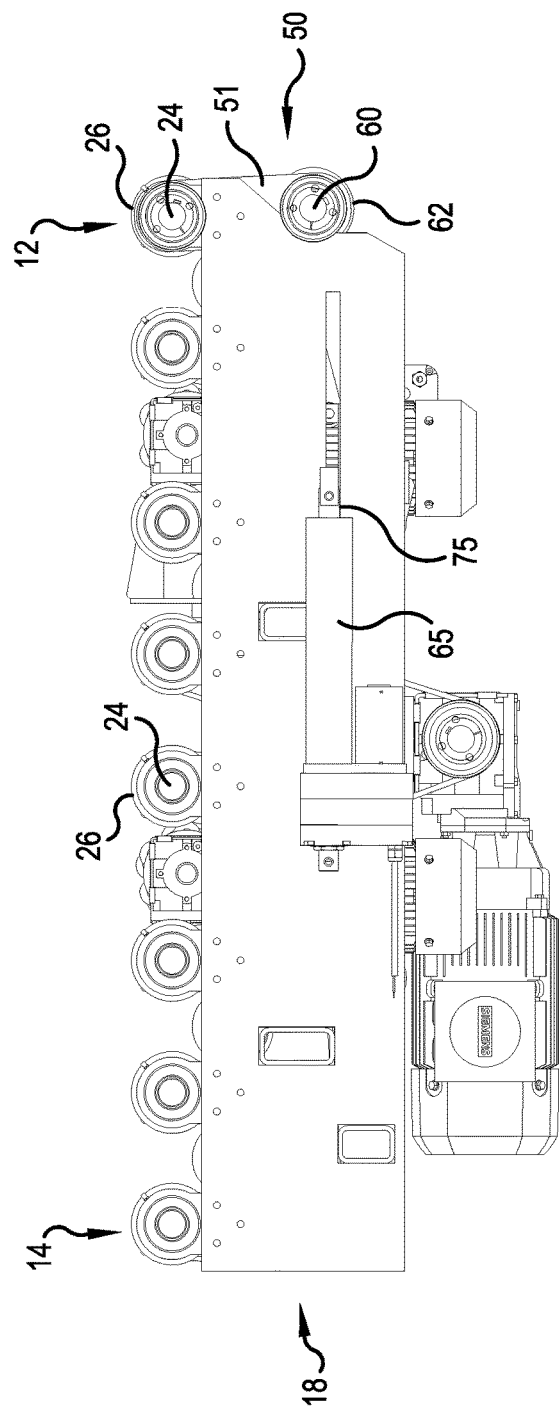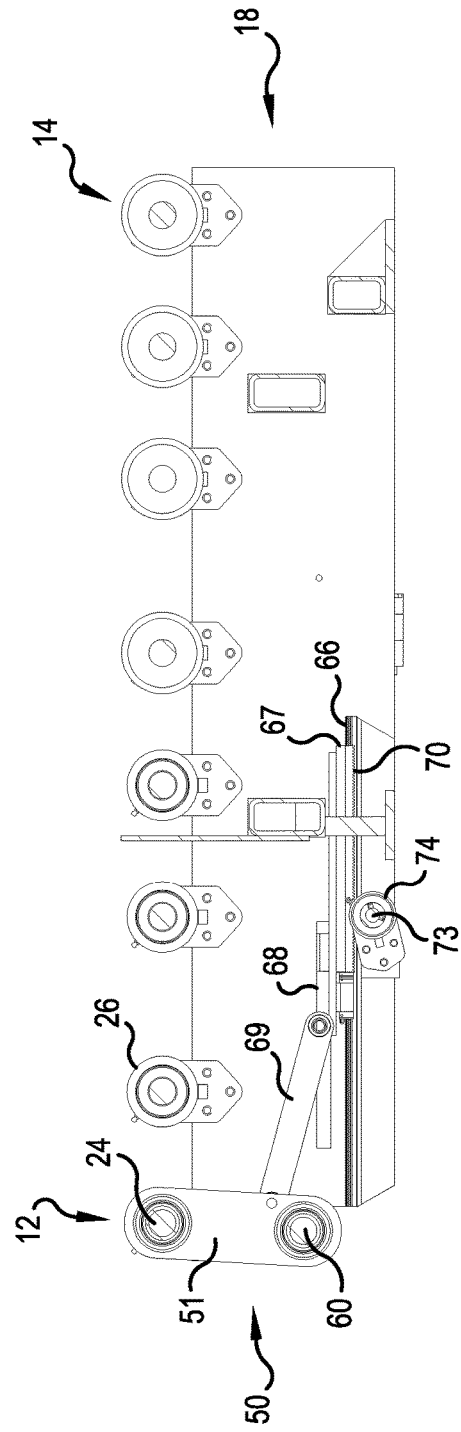

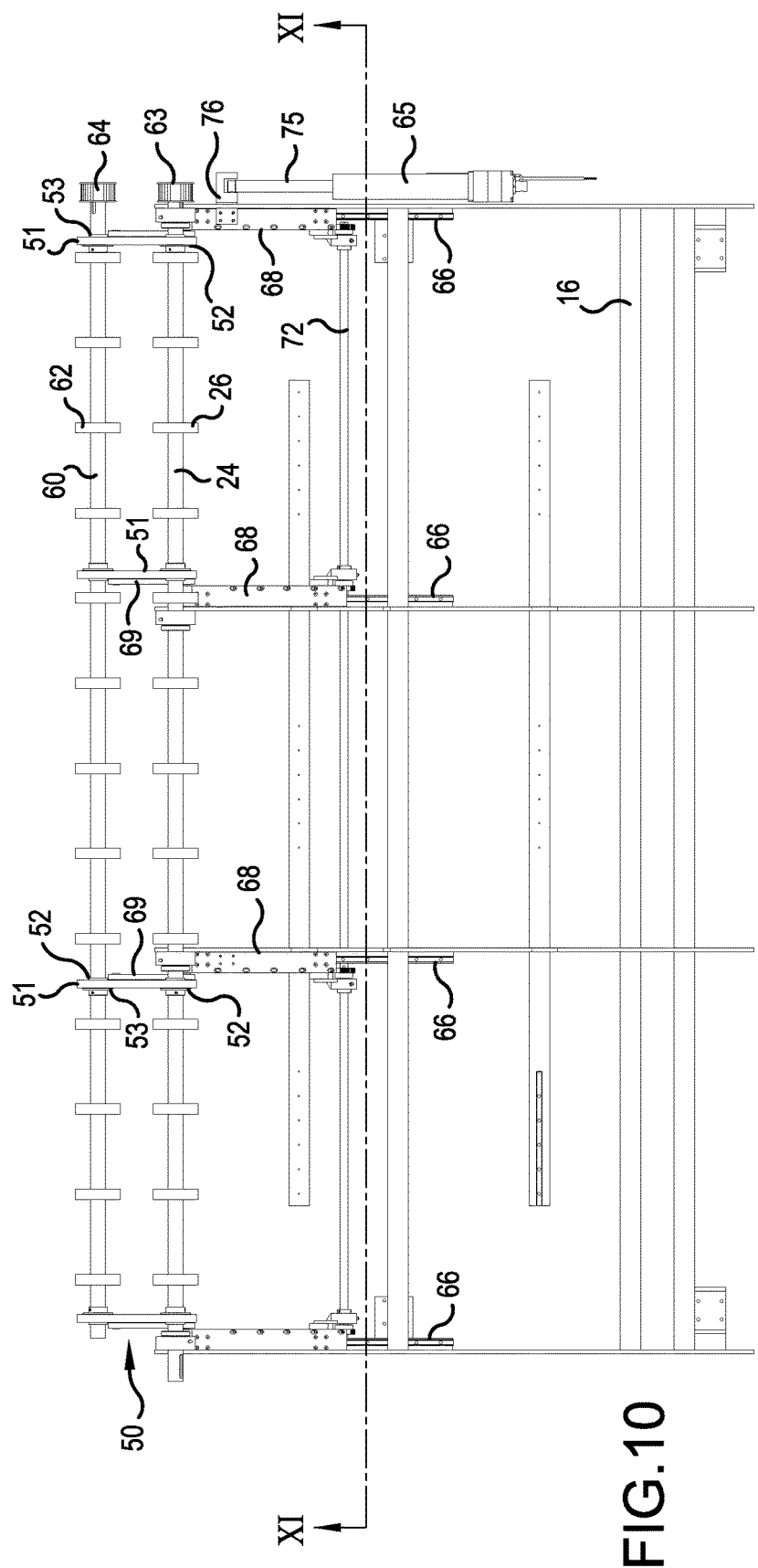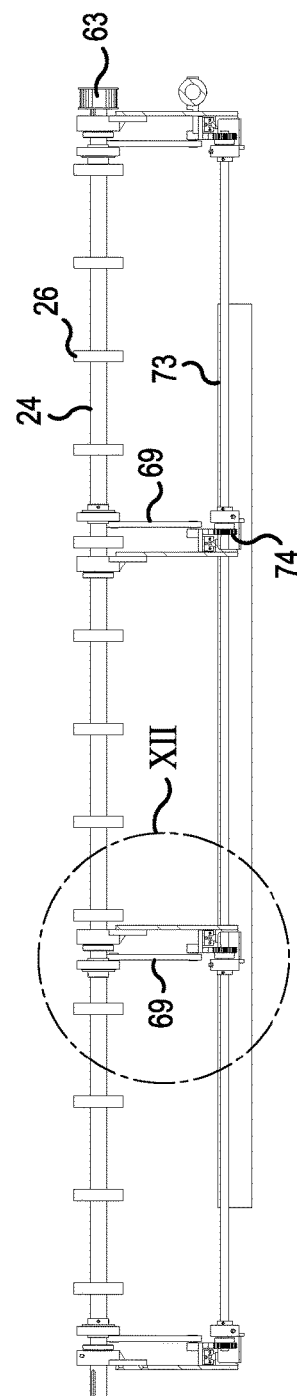
FIG.10
FIG.11

FRONT END CONVEYOR HAVING INTEGRATED TRANSVERSE SCRAP CONVEYOR

CROSS-REFERENCE TO RELATED APPLICATIONS

The present application claims the benefit of U.S. provisional patent application No. 63/183,889 filed May 4, 2021, the entire contents of which is hereby incorporated by reference.

TECHNICAL FIELD

The present disclosure is directed to a front end conveyor for receiving sheets of material from a rotary die cut machine, and, more specifically, toward a front end conveyor having an integrated a transverse scrap conveyor.

BACKGROUND

A layboy is conventionally used to receive sheets of material, often corrugated paperboard, from a rotary die cut (RDC) machine and to feed the sheets to a downstream conveyor such as a stacker. Layboys conventionally comprise a set of upper belts arranged above a set of lower belts to define therebetween a sheet transport pathway. Sheets are received at an upstream nip at the end of the layboy that faces the rotary die cut machine and exit from a downstream nip that faces the input end of a downstream stacker or other conveyor.

Instead of a layboy, a machine that may be referred to as a "front end conveyor," a "front end system" or merely as a "front end" may sometimes be used. The front end conveyor is also intended to be positioned downstream of a rotary die cut machine and upstream of another conveyor such as a stacker. Unlike a layboy, a front end conveyor may have a sheet transport path that is defined by wheels in place of the upper and/or lower belts. The wheels are configured to make direct contact with the moving sheets. An example of a front end conveyor is disclosed in U.S. Pat. No. 10,071,873, assigned to the present applicant, which is hereby incorporated by reference.

One benefit provided by front end conveyors is an improved ability to remove scrap material from sheets of material being transported through the front end conveyor relative to a conventional layboy. See, for example, the system disclosed in U.S. Pat. No. 9,027,737 which is also incorporated herein by reference. However, known front end conveyors are not always able to remove one hundred percent of the scrap attached to or associated with the sheets being transported.

A transverse scrap conveyor is sometimes placed between a rotary die cut machine and a layboy or a front end conveyor to catch scrap material that drops from the rotary die cut machine or that falls near the upstream end of the front end conveyor. A conventional transverse scrap conveyor sits on the ground directly downstream from the rotary die cut machine. Its purpose is to transfer scrap to one side, often the drive side, of the layboy or front end conveyor for disposal. Because this conveyor is typically fixed in place, it can be a difficult to work around when operators need to separate the front end conveyor and the rotary die cut machine to change or service cutting dies of the rotary die cut machine.

Sometimes transverse scrap conveyors are mounted in a pit in the ground immediately downstream of the rotary die cut machine. This may make the scrap conveyor easier to step over; however, the presence of a pit in a facility introduces another set of problems, namely, the pit must be marked and guarded to reduce the likelihood of persons falling into the pit. Also, the pit must be filled in and a new pit dug if a production line is moved. Pits are generally considered highly undesirable.

It would therefore be desirable to provide a front end conveyor having improved scrap removal capabilities and that avoids or reduces the above-mentioned problems.

SUMMARY

These and other problems are addressed by embodiments of the present invention, a first aspect of which comprises a front end conveyor comprising a frame having a first side and a second side, a lower deck and an upper deck. The lower deck includes a plurality of sheet supports, and upper portions of the sheet supports lie in a first plane. The upper deck includes a plurality of sheet guides, and the plurality of sheet supports and the plurality of sheet guides define therebetween a sheet transport path for moving sheets in a sheet transport direction toward the downstream end of the front end conveyor. A transverse scrap conveyor is mounted below the lower deck to carry scrap in a direction perpendicular to the sheet transport direction, and the transverse scrap conveyor is secured to and supported by the frame such that the transverse scrap conveyor is movable with the frame as a unit.

BRIEF DESCRIPTION OF THE DRAWINGS

FIG. 3 is a left side elevational view of the front end conveyor of FIG. 1 with side panels removed to show the interior of the conveyor.

FIG. 4 is a front elevational view of the front end conveyor of FIG. 1.

FIG. 6 is a left side elevational view of the upstream end of the lower deck of the front end conveyor of FIG. 1 with an entry wheel in a raised position.

FIG. 7 is a right side elevational view of the upstream end of the lower deck of the front end conveyor of FIG. 1 with the entry wheel of FIG. 6 in the raised position.

FIG. 8 is a left side elevational view of the upstream end of the lower deck of the front end conveyor of FIG. 6 with an entry wheel in a lowered position.

FIG. 9 is a right side elevational view of the upstream end of the lower deck of the front end conveyor of FIG. 7 with the entry wheel of FIG. 7 in the raised position.

FIG. 10 is a top plan view of an actuating mechanism for shifting the entry wheel between the raised and lowered positions.

FIG. 11 is a sectional elevational view taken along line XI-XI in FIG. 10.

DETAILED DESCRIPTION

Figure 1:
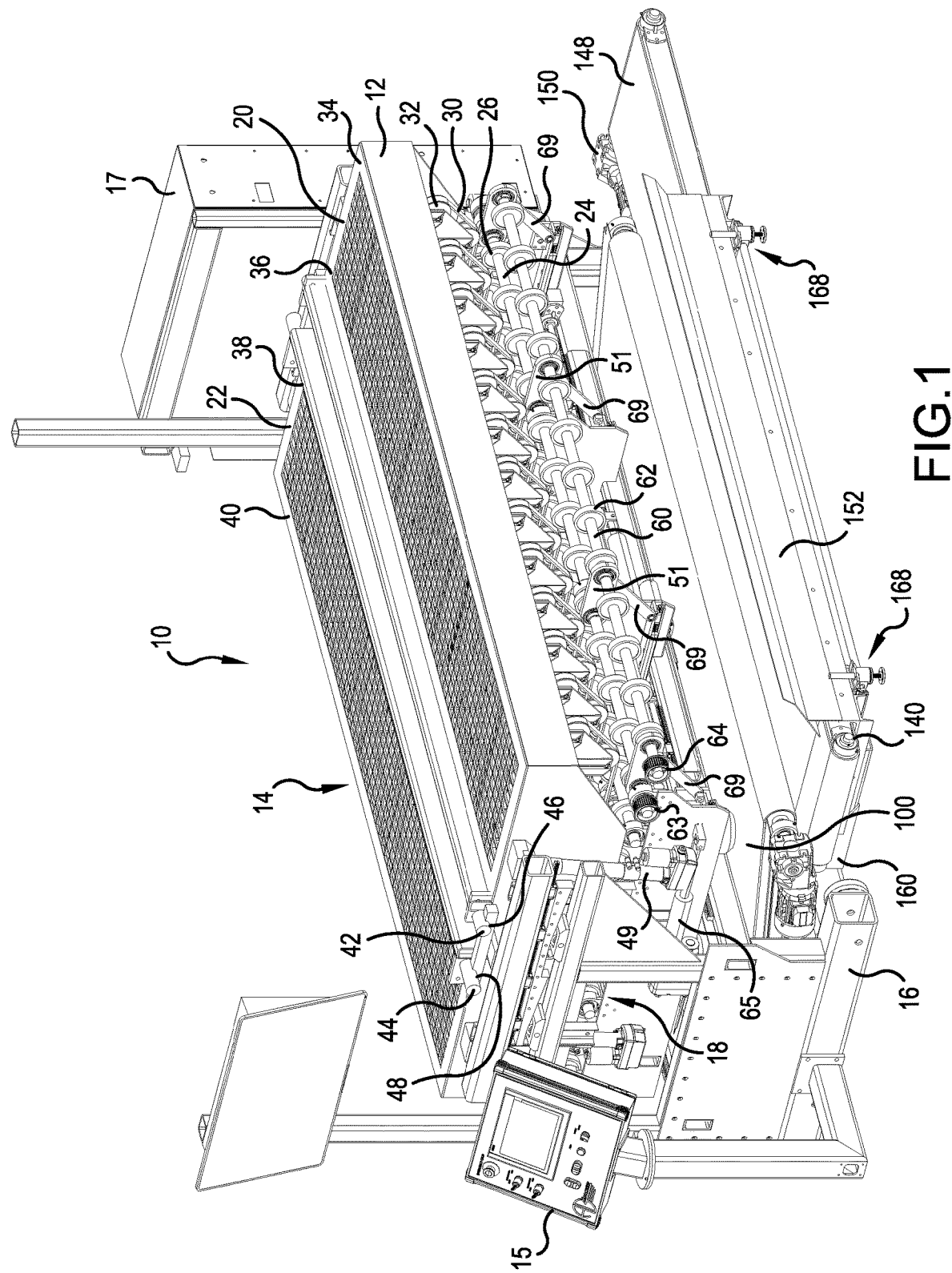
FIG. 1 is a left-front perspective view of a front end conveyor according to a first embodiment of the present disclosure.

Referring now to the drawings, wherein the showings are for purposes of illustrating presently preferred embodiments of the disclosure only and not for the purpose of limiting same, FIGS. 1-5 shows a front end conveyor 10 having an upstream end 12, a downstream end 14, a controller 15, which may include a microprocessor, a frame 16, and an electrical cabinet 17. The side of the front end conveyor 10 closest to the viewer in FIG. 1 may be referred to as the "first" or "left" side of the conveyor 10; the side of the conveyor 10 closest to the viewer in FIG. 2 may be referred to as the "second" or "right" side of the frame. Various features and configurations of this front end conveyor 10 are discussed below.

Dual Clamshell Configuration

Figure 2:
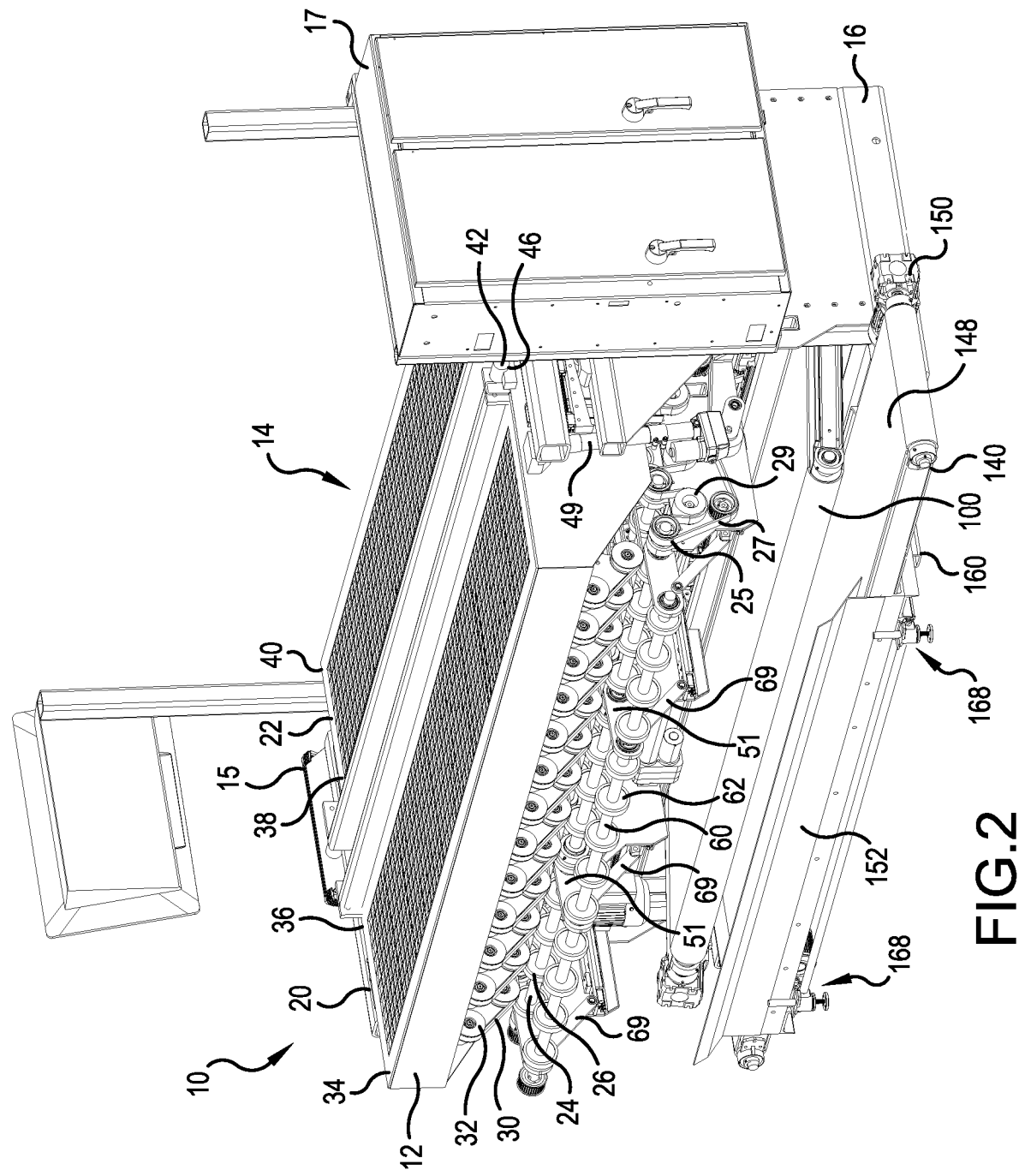
FIG. 2 is a right-front perspective view of the front end conveyor of FIG. 1.

The frame 16 supports a lower deck 18, an upstream upper deck 20 and a downstream upper deck 22. The lower deck 18 comprises a plurality of transverse shafts 24 each of which supports a plurality of disks 26 for rotation with the transverse shafts 24, and the upper portions of the annular outer surfaces of the disks 26 lie in a first plane and form a lower boundary of a sheet transport path 28 (FIG. 3) through the front end conveyor 10. The disks 26 may, for example, comprise aluminum wheels with polyurethane covers. The transverse shafts 24 and their disks 26 may sometimes be referred to as "sheet supports." As shown in FIG. 2, the transverse shafts 24 each include an end pulley 25, and a serpentine belt 27 winds around the end pulleys 25 and a plurality of idler pulleys 29. A drive (not shown) is operatively connected to the belt 27 such that driving the belt 27 causes all the transverse shafts 24 and the attached disks 26 to rotate.

The upstream upper deck 20 and the downstream upper deck 22 each comprise a plurality of belts 30, and each belt 30 is supported by at least two pulleys 32. The belts 30 and pulleys 32 may be referred to as "sheet guides." The lower surfaces of the belts 30 lie in a second plane and define an upper boundary of the sheet transport path 28.

The spacing between the first plane and the second plane may be adjusted by, for example, raising or lowering the upper decks 20, 22 relative to the lower deck 18. Furthermore, while the second plane is generally located above the first plane during operation of the front end conveyor 10, in some situations it may be useful to position the second plane at or below the first plane such that the bottoms of the belts 30 are located below the tops of the disks 26 to flex sheets of material in the sheet transport path 28 for improved control of certain types of materials. In this case, the sheet transport path 28 will still be the path followed by sheets moving though the front end conveyor 10 but the path will undulate in the transverse direction, passing under each of the belts 30 and over each of the disks 26.

The upstream upper deck 20 includes an upstream end 34 and a downstream end 36, and the downstream upper deck 22 includes an upstream end 38 at the downstream end 36 of the upstream upper deck 20 and a downstream end 40. An upstream pivot shaft 42 extends along the downstream end 36 of the upstream upper deck 20, or, in the alternative, the upstream pivot shaft 42 may comprise two shorter individual pivot shafts at opposite sides of the upstream supper deck 20. A downstream pivot shaft 44 extends along the upstream end 38 of the downstream upper deck 22, or, in the alternative, the downstream pivot shaft 44 may also comprise two shorter individual pivot shafts at opposite sides of the downstream upper deck 22. The ends of the upstream pivot shaft 42 are received in semicircular bearings 46 on opposite sides of the frame 16, and the ends of the downstream pivot shaft 44 are received in semicircular bearings 48 on opposite sides of the frame 16 adjacent to the bearings 46. This arrangement allows the upstream upper deck 20 to be pivoted about the axis of the upstream pivot shaft 42 to raise the upstream end 34 of the upstream upper deck 20 relative to the upstream end of the lower deck 18 and also allows the downstream end 40 of the downstream upper deck 22 to be pivoted around the axis of the downstream pivot shaft 44 to raise the downstream end 40 relative to the downstream end of the lower deck 18.

While the upper decks 20, 22 can be raised and lowered manually, preferably electric actuators 49 are provided at the left and right sides of the upstream end 34 of the upstream upper deck 20 and at left and right sides of the downstream end 40 of the downstream upper deck 22 to raise and lower the upstream end 34 of the upstream upper deck 20 and the downstream end 40 of the downstream upper deck 22 and to secure the upper decks 20, 22 in a raised or lowered position. Other mechanisms, such as gas springs, can alternately be used to hold the upper decks 20, 22 in a raised position. Stops (not illustrated) may be provided to limit the downward movement of the upstream end 34 of the upstream upper deck 20 and the downstream end 40 of the downstream upper deck 22 to positions in which the bottoms of the belts 30 of the upstream upper deck 20 and the bottoms of the belts 30 of the downstream upper deck 22 lie in the same plane above the lower deck 18.

In operation, with reference to FIG. 3, sheets of material 54 exit the output 56 of a rotary die cut machine 58 and enter the upstream end of the sheet transport path 28 of the front end conveyor 10. The transverse shafts 24 of the lower deck and/or the belts 30 of the upper deck are driven by one or more drives (not illustrated) to pull the sheets 54 into the front end conveyor 10 and convey the sheets 54 from the upstream end 12 to the downstream end 14 of the front end conveyor 10. The sheets 54 exit the downstream end 14 of the front end conveyor 10 to a stacker 58 or other downstream conveyor.

When it is desirable to access the interior of the front end conveyor 10, e.g., to remove accumulated scrap or jammed sheets of material, or to perform maintenance or belt replacement, the actuators 49 are operated by the controller 15 to extend and thus raise the upstream end 34 of the upstream upper deck 20 relative to the upstream end of the lower deck 18 and/or to raise the downstream end 40 of the downstream upper deck 22 relative to the downstream end of the lower deck 18 and to hold the upper decks 20, 22. The upstream upper deck 20 and the downstream lower deck 22 can be raised and lowered at the same time or independently of one another. The actuators 49 also hold the upstream upper deck 20 and the downstream upper deck 22 in their raised positions while necessary maintenance is performed on elements in the interior of the front end conveyor 10. The two pivotable upper decks 20, 22, allow a worker to access all portions of the interior of the front end conveyor 10 from either the upstream end 12 or the downstream end 14 without having to reach over more than one half the length of the front end conveyor 10. When work on the interior of the front end conveyor 10 is complete, the controller 15 operates the electric actuators 49 to retract and thus lower the upstream end 34 of the upstream m upper deck 20 and the downstream end 40 of the downstream upper deck 22 until the bottoms of the belts 30 of the upstream upper deck 20 and the downstream upper deck 22 again lie in the second plane.

Entry Drop-Down Wheel Shaft

The front end conveyor 10 includes a feature that may be referred to as an entry drop down wheel shaft or a pivotable sheet support 50 which can be adjusted relative to the plane of the sheet transport path 28. The ability to change the position of the pivotable sheet support 50 provides increased control over the entry of the front end conveyor 10, either to increase the space for scrap to fall or to increase the width of the "jaws" of the front end conveyor 10 to help guide the sheets of material 54 into the front end conveyor 10 from the rotary die cut machine 58.

FIGS. 6 and 8 show the left side of the lower deck 18 with the pivotable sheet support 50 in a raised position; FIGS. 7 and 9 show the right side of the lower deck 18 with the pivotable sheet support 50 in a lowered position. The pivotable sheet support 50 comprises a plurality of frame members 51 each having a first opening 52 through which the upstream-most transverse shaft 24 of the primary sheet supports passes. An entry shaft 60 passes through second openings 53 in the frame member 51 and is rotationally supported in these second openings 53. A plurality of entry disks 62 are mounted on the entry shaft 60 for rotation therewith. All of the transverse shafts 24 are driven by the serpentine belt 27 at the right side of the shafts 24 as discussed above and shown in FIG. 2. A pulley 63 (FIG. 1) at the left side of the upstream-most one of the transverse shafts 24 is connected to a pulley 64 at the left side of the entry shaft 60 by a belt (not shown) so that the rotation of the upstream-most one of the transverse shafts 24 rotates the entry shaft 60 and its associated entry disks 62. The entry shaft 60 is thus operatively coupled to the upstream-most transverse shaft 24 and rotates when the upstream-most transverse shaft 24 rotates when the pivotable sheet support 50 is in the raised position of FIGS. 6 and 7 or in the lowered position of FIGS. 8 and 9 or in any intermediate position therebetween.

An actuator 65, which is preferably electric but which could also be hydraulic or pneumatic, is used to shift the entry shaft 60 between the raised position, in which tops of the entry disks 62 lie in the first plane and form an extension of the sheet transport path 28, and the lowered position in which the entry disks 62 are located entirely below the first plane. The connection between the actuator 65 and the pivotable sheet support 50 is described below.

Figure 12:
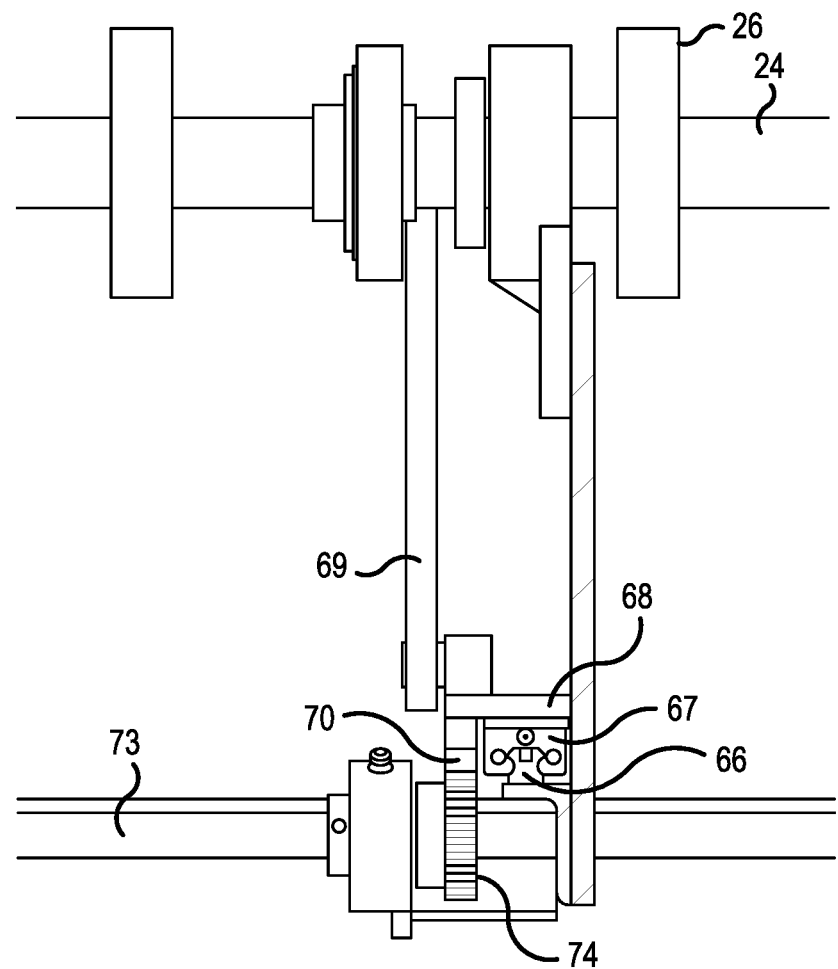
FIG. 12 is a detail view of region XII in FIG. 11.

Referring now to FIG. 10, a plurality of rails 66 are mounted to the frame 16 such that they extend in the sheet transport direction. As best seen in FIG. 11 and the detail view of FIG. 12, a slide 67 is slidably mounted on each of the rails 66, and a rectangular plate 68 having a longest dimension in the sheet transport direction is connected to each of the slides 67. A pivot arm 69 has a first end pivotable connected to the plate 68 and a second end pivotably connected to the frame member 51.

A rack 70 depends from each of the plates 68, and a timing shaft 73 extends transversely to the sheet transport direction and is rotatably supported by the frame 16. A plurality of timing gears 74 are mounted to the timing shaft 73 for rotation therewith. Each of the timing gears 74 engages one of the racks 70. The timing shaft 73 is not powered but rather connects the slides 67 to each other and ensures that the slides 67 move synchronously along the rails 66.

As shown in FIG. 10, a piston 75 of the actuator 65 is connected to the plate 68 on the rail 66 at the left side of the front end conveyor 10 by a connector 76. In FIG. 10, the piston 75 is in its extended position, and the pivotable sheet support 50 is in its raised position. When the actuator 65 is retracted (under the control of the controller 15), it pulls the plate 68 and its associated slide 67 and rack 70 away from the upstream end 12 of the front end conveyor 10. The connection between the slides 67 provided by the racks 70 and the timing shaft 72 and timing gears 74 ensures that the linear force provided by the actuator 65 is applied evenly to the each of the slides 67 so that the slides 67 move smoothly and do not experience lateral forces. This allows a single actuator 65 to be used to actuate the pivotable sheet support 50. As the moving plates 68 pull the second ends of the pivot arms 68 in the downstream direction, the entry shaft 60 supported by the frame members 51 pivots about the axis of the upstream-most transverse shaft 24 to the lowered position.

A plane tangent to the disks 26 of the upstream-most transverse shaft 24 and the entry disks 62 of the entry shaft 60 may be referred to as a third plane. When the pivotable sheet support 50 is in the raised position, the third plane is coextensive with the first plane. When the pivotably sheet support 50 is in the lowered position, the third plane intersects the first plane along a line transverse to the sheet transport direction.

Helical Brush

Figure 13:
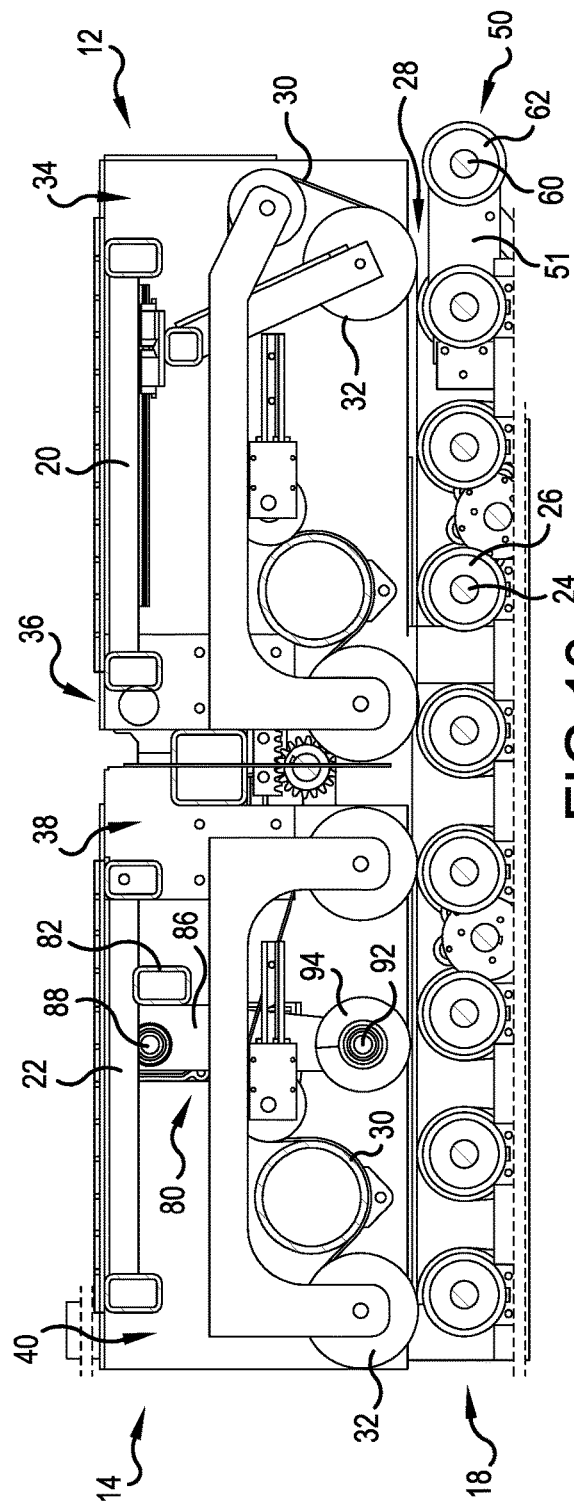
FIG. 13 is left side elevational view of a front end conveyor according to a second embodiment of the present disclosure which includes a helical brush for scrap removal.
Figure 14:
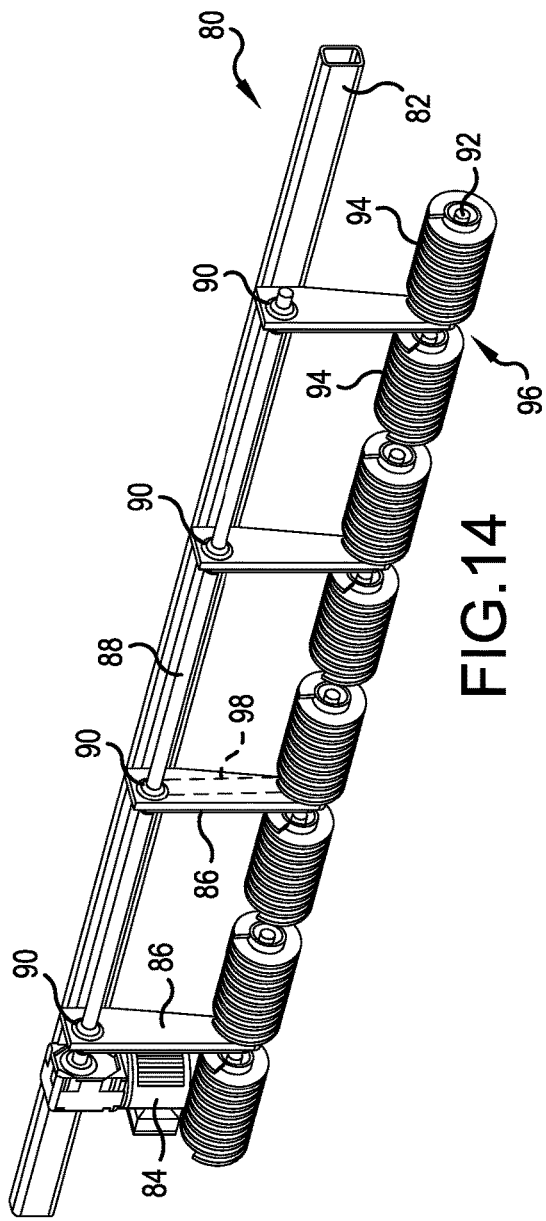
FIG. 14 is a perspective view of the helical brush of FIG. 13.
Figure 15:
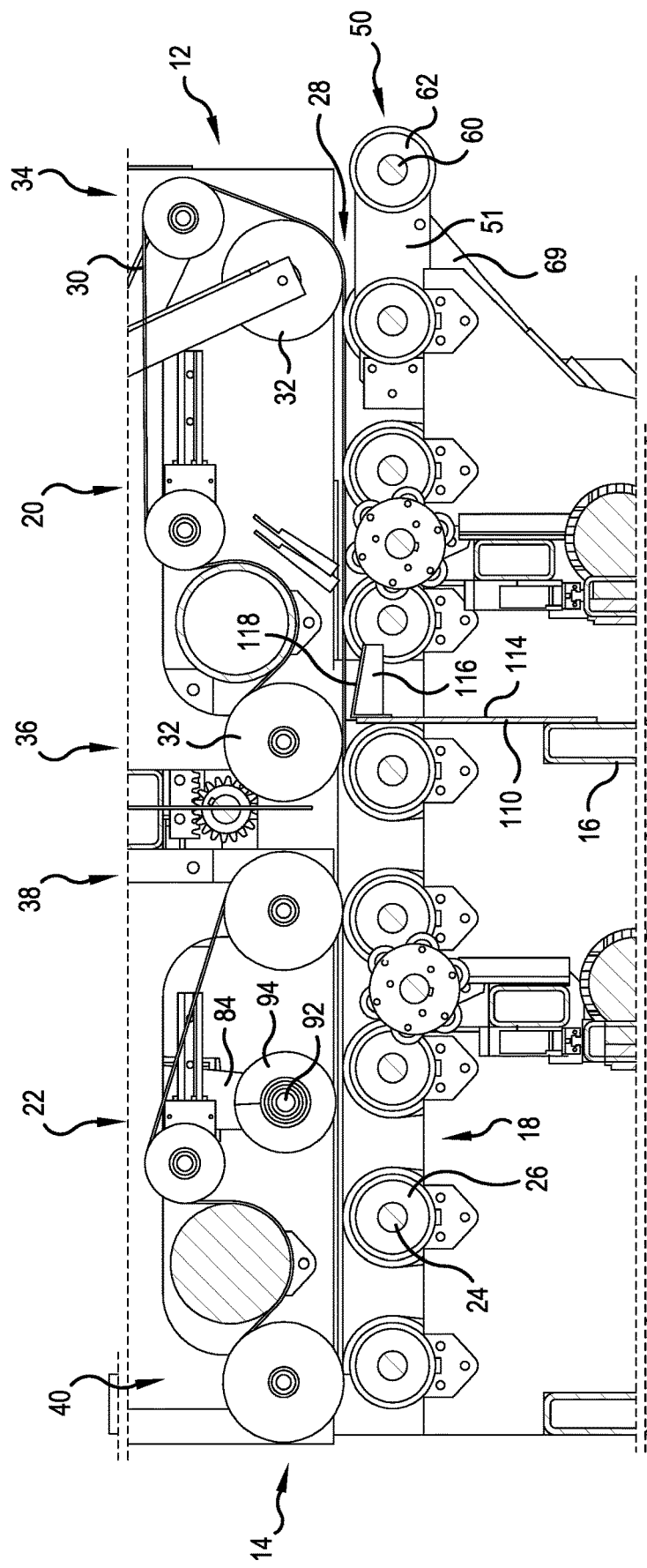
FIG. 15 is a left side elevational view of a front end conveyor according to a third embodiment of the present invention which includes a movable chad wall.

FIGS. 13-15 show a brush assembly 80 configured to remove scrap from the tops of sheets of material 54 traveling along the sheet transport path 28. The brush assembly 80 includes a transverse beam 82 that is supported by the frame 16, a drive 84 mounted to the transverse beam 82, a plurality of belt housings 86 that extend downwardly from the transverse beam 82 and a drive shaft 88 that is operatively connected to the drive 84 and which extends through and is rotationally supported in aligned openings 90 in upper portions of the belt housings 84.

A brush shaft 92 is rotationally supported at the lower end of each of the belt housings 84 such that a portion of the brush shaft 92 projects from each side of each belt housing 84, and a helical brush segment 94 is mounted on each end of each of the brush shafts 92 for rotation therewith. The two brush segments 94 and their associated brush shafts 92 may be referred to as a "helical brush 96," and FIG. 14 shows four helical brushes 96 each including two brush segments 94. A drive belt or drive chain 98 (referred to generically as a "drive belt") is located inside each of the belt housings 84 and connects the drive shaft 88 to each of the brush shafts 92 such that rotation of the drive shaft 88 drives the drive belts 98 and thus rotates the brush shafts 92 and the helical brush segments 94.

The helical brush segments 94 on a given brush shaft 92 are spaced apart from each other along the brush shaft 92, and the belt housings 84 support the brush shafts 92 at a location between the brush segments 94 on a given brush shaft 92. Also the brush shafts 92 of each helical brush 96 are spaced from one another. When the helical brushes 96 rotate, they apply forces against any scrap on the top surfaces of the sheets of material 54 in both longitudinal and transverse directions (relative to the longitudinal movement of the sheets of material 54 along the sheet transport path 28). This helps to both dislodge the scrap and to move the scrap toward the sides of the sheets of material 54 (transverse to the sheet transport direction) where the scrap can fall through the lower deck 18 to the ground or onto a longitudinal scrap conveyor 100.

The speed, rotational direction and location of the helical brushes 96 relative to the sheet transport path 28 are adjustable. FIG. 13 shows a possible location for the helical brush assembly 80 above the sheet transport path 28. The brush assembly 80 can be located in a different position and/or more than one brush assembly 80 can be present. For example, a second helical brush assembly 80 could be located beneath the sheet transport path to brush against the lower sides of the sheets of material 54 in the sheet transport path 28.

Moveable Chad Wall

Small pieces of paperboard cut from a sheet of paperboard by the rotary die cut machine 58 may not be completely detached from the sheet of material 54 when it enters the front end conveyor 10. For example, small openings that are cut in the sheet of material 54 or the material removed from between flap portions of the sheet of material 54 may remain connected to the sheet by small connections. The punched pieces of material are referred to as "chads," and chads that are not completely detached from the paperboard may be referred to as 'hanging chads." A hanging chad 99 is illustrated in FIG. 3.

It is important to remove both loose chads (not shown) and hanging chads 99 before the sheets of material 54 reach a final stack. The brush assembly 80 discussed above and the blower discussed below can remove loose chads from the upper surfaces of the sheets of material 54 traveling along the sheet transport path 18. However, hanging chads 99, especially when they hang downward from the sheets of material 54, are more difficult to remove with a blower or a brush assembly 80.

Figure 16:
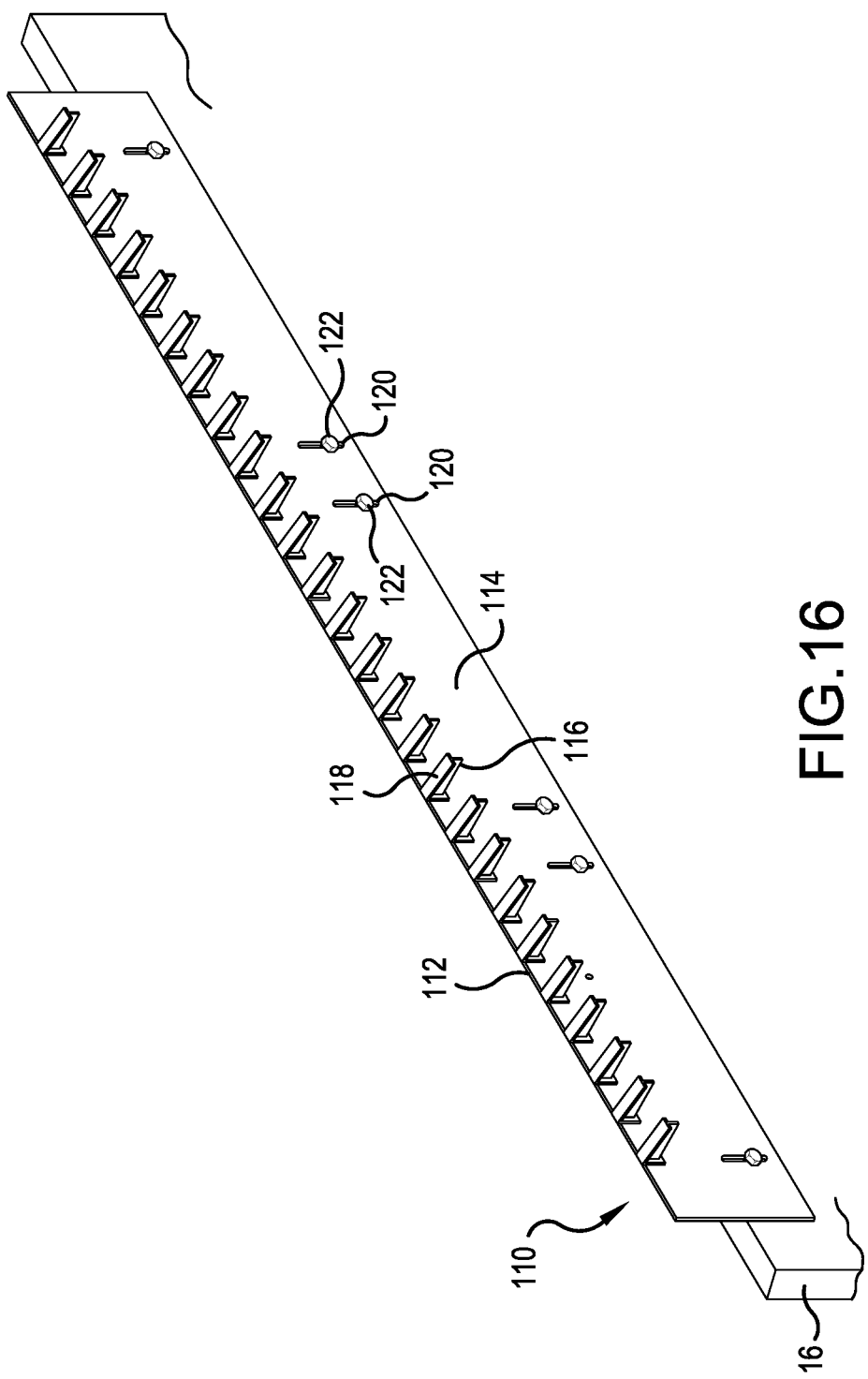
FIG. 16 is a perspective view of the movable chad wall of FIG. 15.
Figure 17:
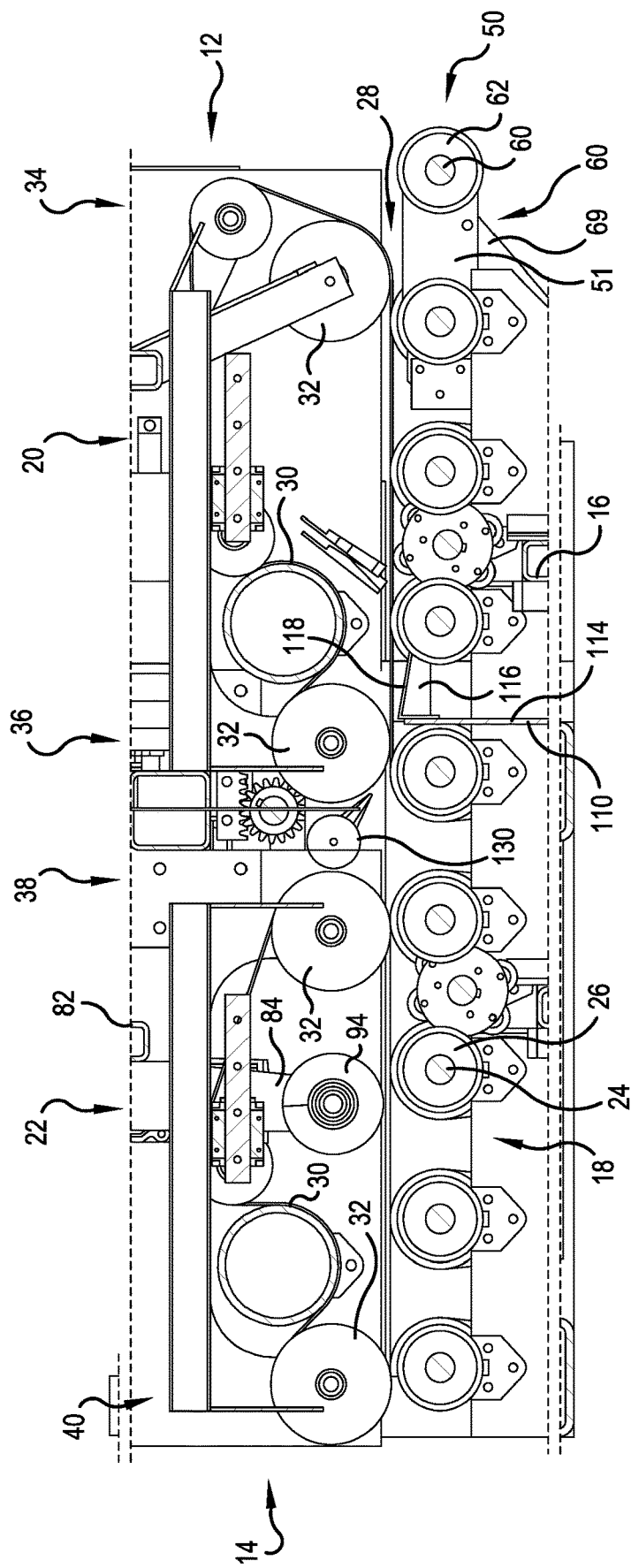
FIG. 17 is a left side elevational view of the front end conveyor of FIG. 15 with an air knife installed.

In order to dislodge these hanging chads 99, the disclosed front end conveyor 10 includes a chad wall 110 which is illustrated in FIGS. 15-17. The chad wall 110 comprises a rectangular sheet of material, such as sheet metal or rigid plastic, that has a width approximately equal to the width of the sheet transport path 28. The chad wall 110 includes a top edge 112, a front surface 114 and a plurality of fingers 116 that project from the front surface 114 from locations along the top edge 112. The front surface 114 is the surface that faces the upstream end 12 of the front end conveyor 10, and the fingers 116 thus extend toward the sheets of material 54 traveling along the sheet transport path 28. The fingers 116 have planar top surfaces 118, and the top surfaces 118 are angled slightly downward in the upstream direction.

The chad wall 110 also includes a plurality of vertical slits 120 via which the chad wall 110 is adjustably mounted to a portion of the frame 16 of the front end conveyor 10 by a plurality of bolts or similar fasteners 122. Loosening the fasteners 122 allows the chad wall 110 to be slid up and down to place the top edge 112 a desired distance below the sheet transport path 28 at which time the fasteners 122 can be tightened to hold the chad wall 110 in a desired position.

The location of the top edge 112 of the chad wall 110 relative to the sheet transport path 28 can be seen in FIG. 15. During operation of the front end conveyor 10, the sheets of material 54 travel along the sheet transfer path 28. Planar portions of the sheets 54 that remain supported at or above the upper portions of the disks 26 of the lower deck 18 will not contact any portion of the chad wall 110. If the front portions of the sheets of material 54 droop a small amount, for example, if flaps are present at the front edges of the sheets of material 54, these front portions may drop below the level of the top edge 112 of the chad wall 110. These drooping front portions will contact and slide up the top surfaces 118 of the fingers 116 so that the sheets of material 54 pass over the chad wall 110 without damaging the sheets of material 54 or adversely affecting the movement of the sheets of material 54 through the front end conveyor 10.

Any hanging chads 99 extending below the level of the top edge 112 of the chad wall 110, however, will either impact the front surface 114 of the chad wall or against one of the fingers 116. Hanging chads 99 impacting the front surface 114 of the chad wall 110 will likely be torn from the moving sheets 54 due to the speed of the moving sheets 54. Hanging chads 99 that impact off-center on one of the fingers 116 may be torn and/or twisted and dislodged from the sheets of material 54. Finally, hanging chads 99 that happen to be aligned with one of the fingers 116 may impact squarely against that finger 116. However, the impact against the leading edge of the finger 116 in combination with the rapid folding of the hanging chad 99 upwardly against the underside of the sheet of material 54 as the hanging chad 99 travels along the top surface 118 of the finger 116 is also likely to dislodge the hanging chad 99. The chad wall 110 therefore significantly reduces the number of hanging chads 99 on the sheets of material 54 as the sheets of material 54 move through the front end conveyor 10.

Blower/Air Knife System

FIG. 17 shows a blower in the form of an air knife 130 mounted above the sheet transport path 54. The air knife 130 extends across substantially the entire width of the sheet transport path 54 and is directed at the sheet transport path 54 to dislodge scrap material present on the sheets of material 54. The air knife 130 may have a single outlet that extends across substantially the entire width of the sheet transport path or alternately may include a plurality of separate jets, the direction of each of which may be independently adjustable. When the blower is sufficiently powerful or when an air knife 130 is used as the blower, even chads that remain partially attached to the upper surfaces of the sheets of material 54 may be severed or torn from the sheets of material 54 and blown off the sheets of material 54.

FIG. 17 shows the air knife 130 located about half way between the upstream and downstream ends 12, 14 of the front end conveyor 10 below the junction of the upstream upper deck 20 and the downstream upper deck 22. The upstream upper deck 20 includes a first set of belts 30 and the downstream upper deck 22 includes a second set of belts 30 spaced apart from the belts 30 of the upstream upper deck 20. Therefore no belts 30 contact the sheets of material 54 in the location where the air knife 130 is mounted. It is preferable to place the air knife 130 in this location (or at least to direct the air output of the air knife 130 toward this location) where no belts 30 are present to hold scrap against the upper surfaces of sheets of material 54. This location increases the likelihood that scrap will be detached or at least loosened from the sheets of material 54 if not completely removed by the air knife 130. The loosened scrap material may then be more easily removed by the helical brush assembly 80 discussed above. If desired, a second blower or air brush 130 can be placed beneath the sheet transport path and directed against the lower surfaces of the sheets of material 54 to help dislodge hanging chads 99.

The air knife 130 is preferably rotatable about an axis transverse to the sheet transport direction so that the output of the air knife can be directed at different locations along the sheet transport path. The air knife is also preferably mounted so that it can be raised and lowered relative to the sheet transport path.

Integrated Transverse Scrap Conveyor

The present front end conveyor 10 also includes a transverse scrap conveyor 140 that can be attached to the frame 16 of the front end conveyor 10 so that the transverse scrap conveyor 140 is movable with the front end conveyor 10. By integrating the transverse scrap conveyor 140 with the front end conveyor 10 in this manner, the transverse scrap conveyor 140 is movable with the front end conveyor 10 when an operator needs to access the rotary die cut machine 58, and the operator therefore does not need to reach over or move a stand-alone transverse scrap conveyor as has been done in the past. Beneficially, the transverse scrap conveyor 140 can also be detached from the front end conveyor and used as a stand-alone unit if desired.

Figure 5:
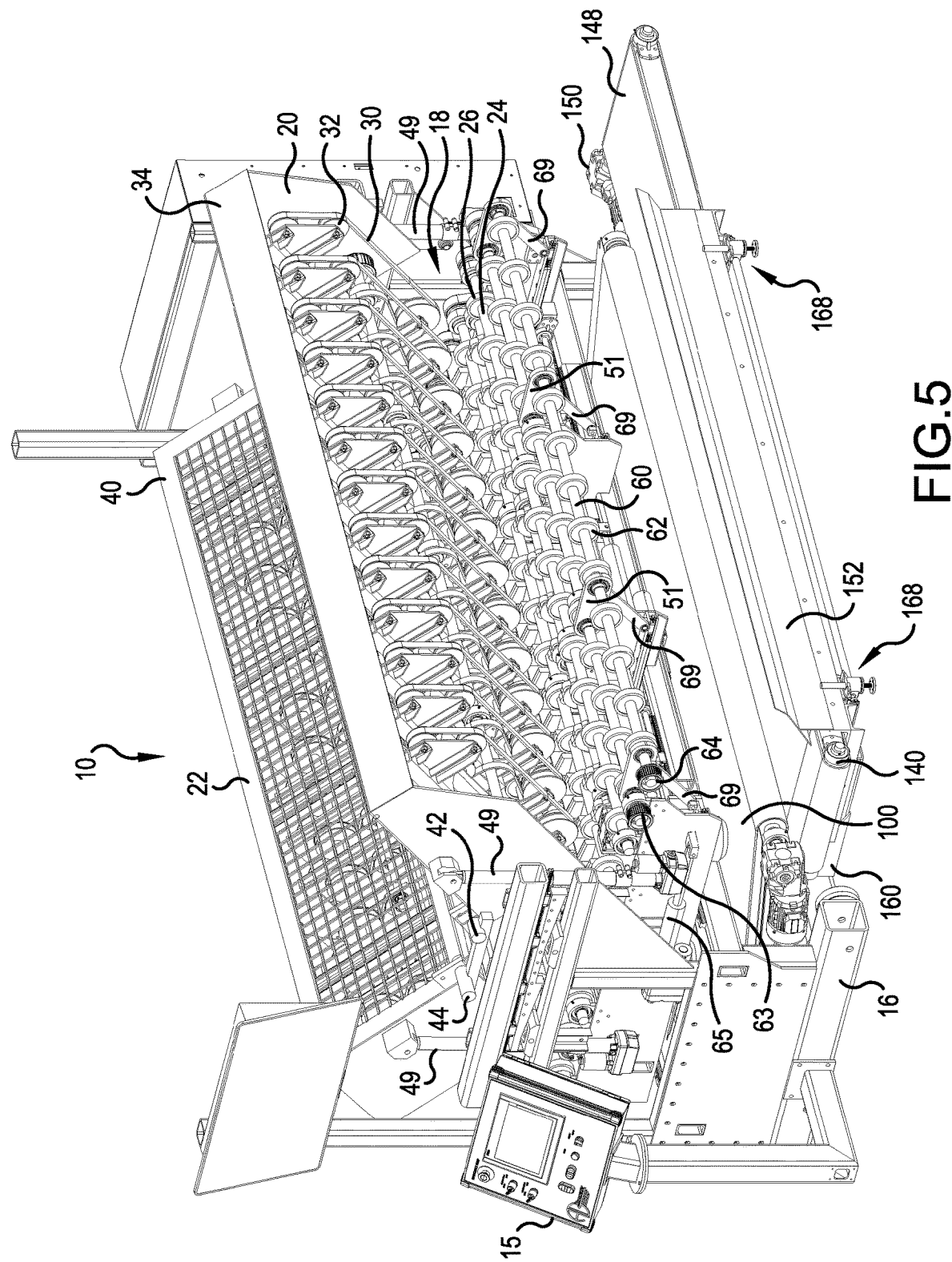
FIG. 5 is a left-front perspective view of the front end conveyor of FIG. 1 with an upstream section and a downstream section of the upper conveyor deck raised.
Figure 18:
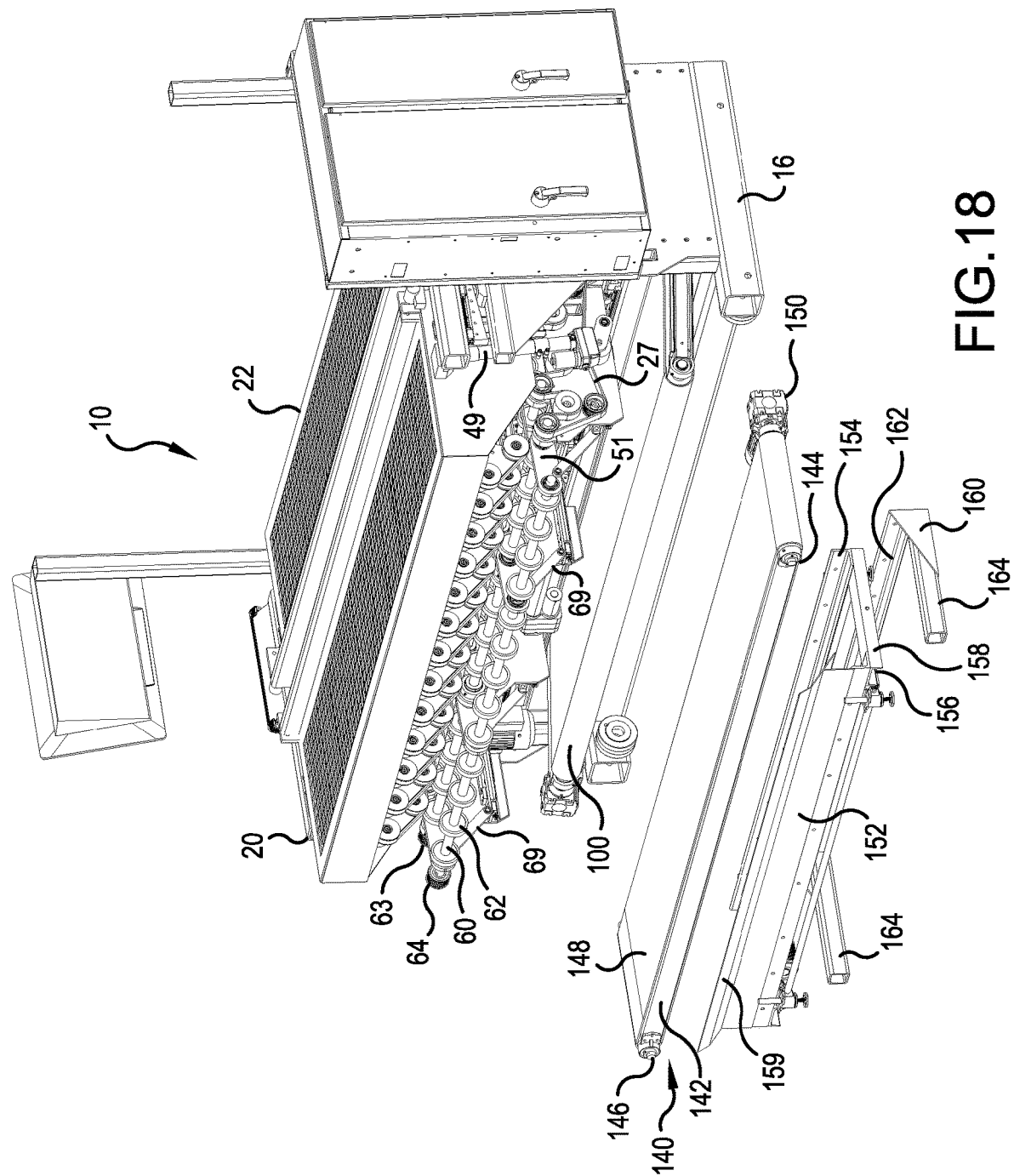
FIGS. 18 and 19 are right side perspective views of the front end conveyor of FIG. 1 partially exploded to show elements of the transverse scrap conveyor and its supports.
Figure 19:
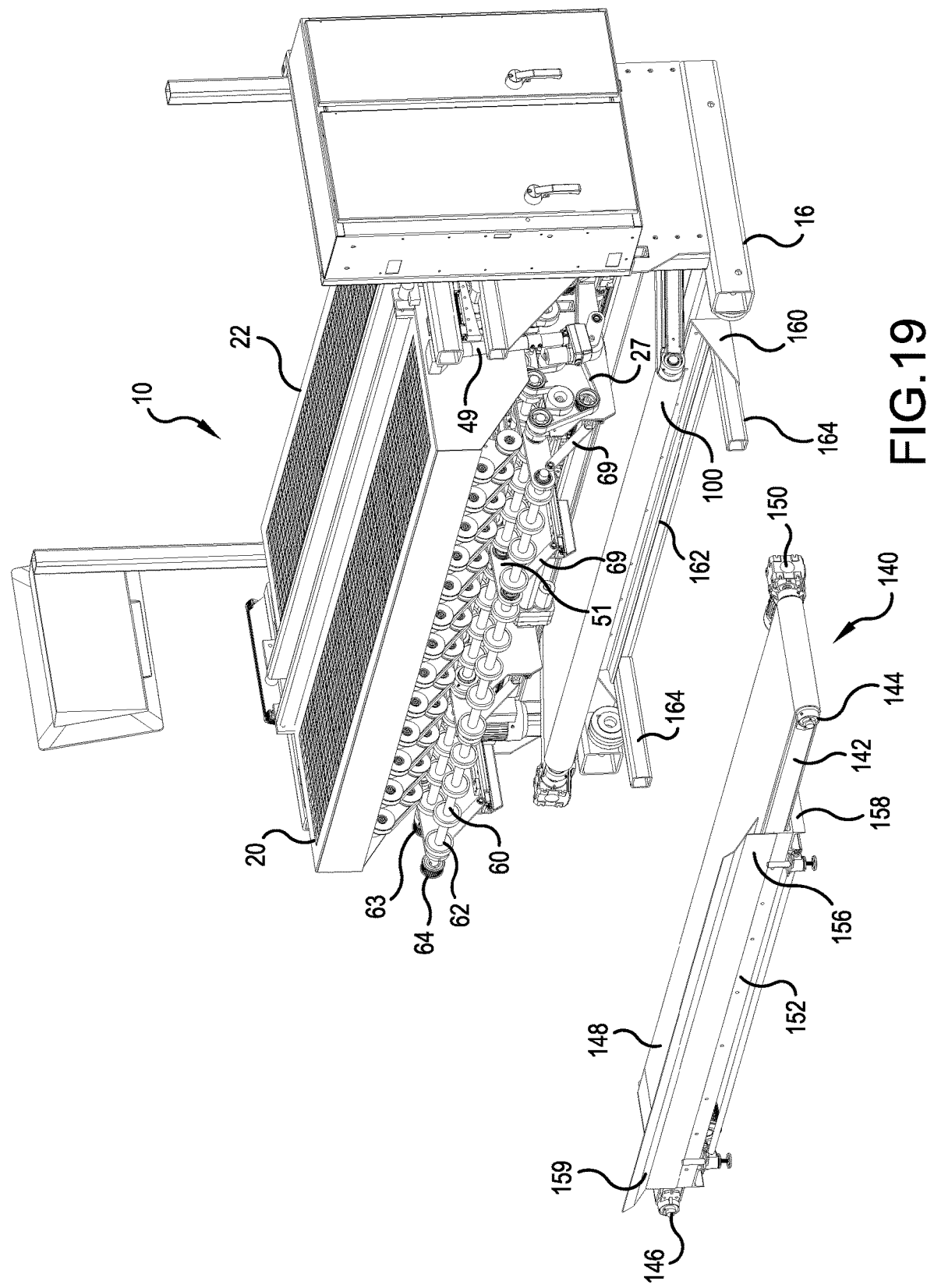

The transverse scrap conveyor 140 and its associated supports can be seen for example, in FIGS. 1 and 5. However, the following description is directed to FIGS. 18 and 19 which show the transverse scrap conveyor 140 partially separated from the front end conveyor 10 to make various components thereof easier to see.

The transverse scrap conveyor 140 includes a conveyor frame 142 that supports a driven end roller 144 and a non-driven end roller 146. A belt 148 extends around the driven end roller 144 and the non-driven end roller 146, and a drive 150 is operatively connected to the driven end roller 144 to rotate the driven end roller 144 to move the belt 148 in a forward or reverse direction around the conveyor frame 142.

The transverse scrap conveyor 140 is mountable in a cradle 152 that includes an upstanding front wall 154, a rear wall 156 and channel members 158 that connect the front wall 154 to the rear wall 156. The distance from the front wall 154 of the cradle 152 to the rear wall 156 of the cradle 152 is approximately the same as the width of the transverse scrap conveyor 140, and the transverse scrap conveyor 140 is mounted in the cradle 152 and connected to the conveyor frame 142 by bolts or other fasteners that extend through the front wall 154 of the cradle 152 into one side of the conveyor frame 142 and through the rear wall 156 of the cradle 152 into another side of the conveyor frame 142. An angled scrap guide 159 is located at the top edge of the front wall 154.

The cradle 152 is mountable to a support frame 160 that includes a body member 162 that extends in the transverse direction of the front end conveyor 10 and two arm supports 164 that project from the body member 162 in the upstream direction. The bottoms of the arm supports 164 are located above the support surface on which the front end conveyor 10 rests when the body member 162 is connected to the frame 16. The arm supports 164 have a profile complementary to bottom openings of the channel members 158 which allows the channel members 158 to receive the arm supports 164 to securely support the cradle 152 on the support frame 160. The cradle 152 is also bolted to the support frame 160.

Mounting the transverse scrap conveyor 140 to the front end conveyor 10 in this manner integrates the transverse scrap conveyor 140 and the front end conveyor 10 so that the transverse scrap conveyor 140 moves as a component of the front end conveyor 10 and thus moves out of the way with the front end conveyor 10 when the front end conveyor 10 is rolled away from the rotary die cut machine 58 when it is necessary to access the side of the rotary die cut machine that faces the front end conveyor 10.

Figure 20:
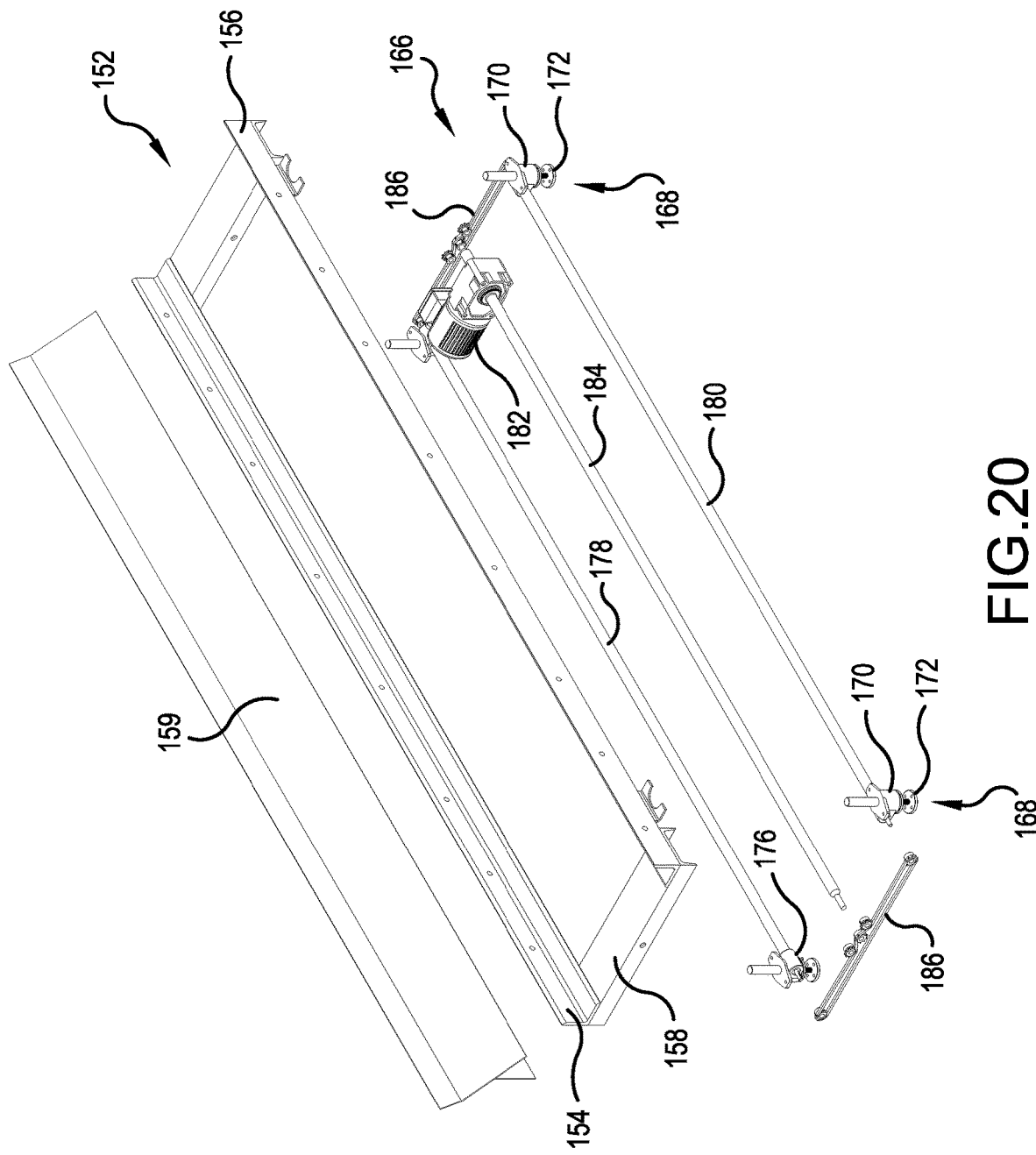
FIG. 20 shows a lift assembly for adjusting the height of the transverse scrap conveyor of FIGS. 18 and 19.

FIG. 20 is an exploded view of the cradle 152 and an optional lift system 166 for the cradle 152 that allows the cradle 152 to rest on the support surface that supports the front end conveyor 10 when it is not desired to connect the transverse scrap conveyor 140 to the support frame 160 of the front end conveyor 10. The lift system 166 includes four adjustable supports 168 each mounted at a corner of the cradle 152, and each support 168 includes a cylinder 170 and a foot 172 extending therefrom. The feet 172 can be manually screwed into and out of the cylinders 170 to adjust the height of the cradle 152 on the support surface. In addition, the feet 172 can be extended and retracted from the cylinders 170 by rotating a mechanism in an opening 176 in the cylinder 170. The lift system 166 includes a first rod 178 connected between the openings 176 of a first pair of the supports 168 and a second rod 180 connected between the openings 176 of a second pair of the supports 168. A drive 182 is provided for rotating a drive shaft 184, and the drive shaft 184 is connected to the first rod 178 and the second rod 180 by two drive belts 186. Operating the drive 182 in a first direction rotates the first rod 178 and the second rod 180 in a first direction to cause the feet 172 to move out of the cylinders 170; operating the drive 182 in the opposite direction rotates the first rod 178 and the second rod 180 in a second direction to draw the feet 172 back into the cylinders 170.

When the feet 172 are fully retracted, the cradle 152 can be mounted to the support frame 160 and fully supported by the support frame 160. The feet 172 can also be extended while the cradle 152 is mounted on the support frame 160 to provide additional stability to the transverse scrap conveyor 140 and retracted when it is desired to move the transverse scrap conveyor 140 as a unit with the front end conveyor 10. Or, the supports 168 can provide independent support for the cradle 152 when it is not desired to connect the transverse scrap conveyor 140 to the front end conveyor 10.

In operation, scrap that falls through the bottom deck 18 lands on the longitudinal scrap conveyor 100 and is carried toward the upstream end 12 of the front end conveyor 10 and dropped onto the transverse scrap conveyor 140. Scrap that falls from the rotary die cut machine 58 also drops onto the transverse scrap conveyor 140, possibly guided by the angled scrap guide 159. The transverse scrap conveyor 140 is driven to move the scrap to one side of the front end conveyor 10 from where it can be removed and discarded. When it is necessary to access the rotary die cut machine 58, the front end conveyor 10 can be rolled away from the rotary die cut machine 58 and the attached transverse scrap conveyor 140 will move with the front end conveyor 10.

The present invention has been described herein in terms of several preferred embodiments. Modifications and additions to these embodiments will become apparent to persons of ordinary skill in the art upon a reading of the foregoing description. It is intended that all such modifications and additional form a part of the present invention to the extent they fall within the scope of the several claims appended hereto.

What is claimed is:

1. A front end conveyor having an upstream end and a downstream end, the front end conveyor comprising:
   a frame comprising a plurality of interconnected frame members, at least one first frame member of the plurality of interconnected frame members comprising a bottom frame member configured to rest on a support surface;

a lower deck supported by the frame and including a plurality of sheet supports, upper portions of the sheet supports lying in a first plane;

an upper deck supported by the frame and including a plurality of sheet guides, the plurality of sheet supports and the plurality of sheet guides defining therebetween a sheet transport path for moving sheets in a sheet transport direction toward the downstream end of the front end conveyor; and a transverse scrap conveyor below the lower deck configured to carry scrap in a direction perpendicular to the sheet transport direction, the transverse scrap conveyor being mounted on at least one second frame member of the plurality of frame members, wherein the at least one second frame member is connected to the at least one first frame member such that the at least one second frame member is held above the support surface when the bottom frame member rests on the support surface.

2. The front end conveyor according to claim 1, wherein the transverse scrap conveyor is located beneath an upstream end of the lower deck.

3. The front end conveyor according to claim 1, including a longitudinal scrap conveyor beneath the lower deck, the longitudinal scrap conveyor having a first end at the upstream end of the front end conveyor and a second end at the downstream end of the front end conveyor, the longitudinal scrap conveyor being configured to carry scrap that falls from the sheet transport path in the sheet transport direction or in a direction opposite the sheet transport direction, wherein the transverse scrap conveyor is located beneath the first end or the second end of the longitudinal scrap conveyor and configured to catch scrap that falls from the longitudinal scrap conveyor.

4. The front end conveyor according to claim 3, wherein the longitudinal scrap conveyor is configured to carry the scrap in the direction opposite the sheet transport direction, and wherein the transverse scrap conveyor is located beneath the first end of the longitudinal scrap conveyor.

5. The front end conveyor according to claim 4, including a drive configured to drive the transverse scrap conveyor, the drive being supported by the frame.

6. The front end conveyor according to claim 4, wherein the plurality of lower sheet supports comprise a plurality of shafts extending perpendicular to the sheet transport direction, and wherein a plurality of disks are attached to each of the plurality of shafts.

7. The front end conveyor according to claim 6, wherein the plurality of disks are configured to rotate with each of the plurality of shafts.

8. The front end conveyor according to claim 7, wherein the disks of a first shaft of the plurality of shafts are offset from the disks of a second shaft of the plurality of shafts in a direction transverse to the sheet transport direction.

9. The front end conveyor according to claim 8, wherein each of the disks has an annular outer surface, and wherein an upper portion of the outer surface of each of the disks is configured to contact the sheets of material in the sheet transport path.

10. The front end conveyor according to claim 9, wherein the upper sheet guides comprise a plurality of belts, and wherein each of the plurality of belts is supported by at least two pulleys.

11. A system comprising:
a rotary die cut machine having an output;
a stacking conveyor having an input; and
the front end conveyor according to claim 1 arranged between the output of the rotary die cut machine and the input of the stacking conveyor and configured to receive the sheets of material from the rotary die cut machine at the upstream end of the front end conveyer and to output the sheets of material from the downstream end of the front end conveyor toward the input of the stacking conveyor.

12. The system according to claim 11, wherein the transverse scrap conveyor is positioned to catch scrap emitted from the output of the rotary die cut machine.

13. The front end conveyor according to claim 1, wherein the transverse scrap conveyor is supported by the frame such that the transverse scrap conveyor is movable with the frame as a unit.

14. A front end conveyor having an upstream end and a downstream end, the front end conveyor comprising:
a frame comprising a plurality of interconnected frame members;

a lower deck supported by the frame and including a plurality of sheet supports, upper portions of the sheet supports lying in a first plane;

an upper deck supported by the frame and including a plurality of sheet guides, the plurality of sheet supports and the plurality of sheet guides defining therebetween a sheet transport path for moving sheets in a sheet transport direction toward the downstream end of the front end conveyor; and a transverse scrap conveyor below the lower deck configured to carry scrap in a direction perpendicular to the sheet transport direction, wherein a first frame member of the plurality of fame members is located below the lower conveyor deck and extends in the direction perpendicular to the sheet transport direction, wherein a second frame member of the plurality of frame members extends from the first frame member in an upstream direction, wherein a third frame member of the plurality of frame members extends from the first frame member in the upstream direction, wherein a cradle is supported by the second frame member and the third frame member, and wherein the transverse scrap conveyor is mounted in the cradle.

15. The front end conveyor according to claim 14, wherein the cradle includes at least one adjustable support extendable and retractable relative to the transverse scrap conveyor.

16. The front end conveyor according to claim 14, wherein the plurality of sheet supports comprise a plurality of shafts extending perpendicular to the sheet transport direction, and wherein a plurality of disks are attached to each of the plurality of shafts for rotation with each of the plurality of shafts.

17. The front end conveyor according to claim 14, wherein the cradle is mounted on the second frame member and the third frame member.

18. A front end conveyor having an upstream end and a downstream end, the front end conveyor comprising:
- a frame comprising a plurality of interconnected frame members including a first frame member and at least one cantilevered second frame member, the at least one second frame member extending from the first frame member in the upstream direction;
- a lower deck supported by the frame and including a plurality of sheet supports, upper portions of the sheet supports lying in a first plane;
- an upper deck supported by the frame and including a plurality of sheet guides, the plurality of sheet supports and the plurality of sheet guides defining therebetween a sheet transport path for moving sheets in a sheet transport direction toward the downstream end of the front end conveyor; and
- a transverse scrap conveyor at least partially supported by the at least one second frame member and configured to carry scrap in a direction perpendicular to the sheet transport direction.

19. The front end conveyor according to claim 18,
- wherein the a cradle is supported by the at least one second frame member, and
- wherein the transverse scrap conveyor is mounted in and supported by the cradle.

* * * * *